(12) United States Patent
Burgess et al.

(10) Patent No.: US 9,058,763 B2
(45) Date of Patent: Jun. 16, 2015

(54) SYSTEM AND METHOD FOR AUTOMATIC AGGREGATION OF MULTIPLE PHYSICAL DISPLAY DEVICES INTO A SINGLE LOGICAL DISPLAY SURFACE

(71) Applicant: SYMBOL TECHNOLOGIES, INC., Holtsville, NY (US)

(72) Inventors: William T Burgess, Holbrook, NY (US); Allan Perry Herrod, Mission Viejo, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 235 days.

(21) Appl. No.: 13/932,305

(22) Filed: Jul. 1, 2013

(65) Prior Publication Data

US 2015/0002371 A1    Jan. 1, 2015

(51) Int. Cl.
*G09G 5/00* (2006.01)
*G09G 5/12* (2006.01)

(52) U.S. Cl.
CPC ........................................ *G09G 5/12* (2013.01)

(58) Field of Classification Search
CPC ...... G06F 3/1423; G06F 3/1446; G09G 3/002
USPC ................................ 345/1.1–1.3, 173–179; 178/18.01–18.04
See application file for complete search history.

(56) References Cited

U.S. PATENT DOCUMENTS

| | | | | |
|---|---|---|---|---|
| 4,797,750 A | * | 1/1989 | Karweit | 386/246 |
| 4,857,912 A | * | 8/1989 | Everett et al. | 340/508 |
| 4,962,473 A | * | 10/1990 | Crain | 340/541 |
| 5,300,943 A | * | 4/1994 | Jakobs et al. | 345/1.1 |
| 5,412,768 A | * | 5/1995 | Ozaki | 345/585 |
| 5,576,950 A | * | 11/1996 | Tonomura et al. | 386/200 |
| 5,696,982 A | * | 12/1997 | Tanigawa et al. | 715/236 |
| 5,909,548 A | * | 6/1999 | Klein et al. | 709/217 |
| 6,611,241 B1 | | 8/2003 | Firester et al. | |
| 6,774,868 B1 | | 8/2004 | Bowen | |
| 2004/0009750 A1 | | 1/2004 | Beros et al. | |
| 2005/0083331 A1 | | 4/2005 | Mackinlay | |
| 2008/0216125 A1 | | 9/2008 | Li et al. | |
| 2010/0159160 A1 | | 6/2010 | Basile et al. | |
| 2011/0109526 A1 | | 5/2011 | Bauza et al. | |
| 2011/0140993 A1 | | 6/2011 | Bess | |
| 2011/0164065 A1 | | 7/2011 | Mate et al. | |
| 2011/0229106 A1 | | 9/2011 | Cho | |
| 2012/0084718 A1 | | 4/2012 | Gimpl et al. | |
| 2012/0206319 A1 | | 8/2012 | Lucero et al. | |

FOREIGN PATENT DOCUMENTS

JP          7175130 A          7/1995

* cited by examiner

*Primary Examiner* — Kimnhung Nguyen (57) ABSTRACT

A system and method automatically determines aligned edges of display devices for an aggregate display. The system includes a first mobile unit (MU) and a second MU. The first and second MUs include respective emitters, sensors, transceivers, and display devices. The emitters of the MUs are activated to transmit edge patterns based upon an inter-device communication such that when one of the sensors of the first MU receives the edge pattern from the second MU and vice versa, the MUs have an aligned edge. Select emitters of the MUs are activated to transmit a further edge pattern based upon a further inter-device communication such that when a corresponding sensor of the first MU receives the further edge pattern from the second MU and vice versa, the aligned edges are verified to be aligned.

20 Claims, 7 Drawing Sheets

SYSTEM AND METHOD FOR AUTOMATIC AGGREGATION OF MULTIPLE PHYSICAL DISPLAY DEVICES INTO A SINGLE LOGICAL DISPLAY SURFACE

BACKGROUND OF THE INVENTION

A plurality of display devices may be configured and arranged such that they are aggregated. The aggregation of the display devices enable a single image or view to be shown across all the display devices. That is, each display device shows a portion of the view such that all the display devices show the entire view. For example, in a simplest case, a computer may be coupled to two display devices such as monitors. The user may select a display option in which the view is extended. Accordingly, the overall area of the view for the computer is a combination of the two display devices. However, such a scenario requires little to no configuration. In another example, an enhanced display utilizes a plurality of display devices, particularly, more than two monitors. However, when the plurality of display devices are all coupled to a single processor, the processor is capable of configuring the aggregation simply by showing the portion of the entire view on the display devices and having the user manually position the display devices such that the entire view is properly shown.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When a plurality of display devices are utilized for an aggregate display in which each display device is associated with a different processor, the manner in which the aggregation is accomplished becomes complex. That is, when a user is no longer required to provide any manual positioning of the display devices, the system must be configured to somehow determine the manner in which the entire view is properly shown. Remote electronic devices that are autonomous (having its own processor) and isolated (self-contained) may be utilized as components of a larger system. When these electronic devices are co-located, an aggregated display surface may be provided. For example, the processors may be provided a portion of the overall view but position and orientation data is required for the other display devices being used for the overall view. As discussed above when the display devices are all coupled to a single processor, a conventional manner to aggregate a system of display devices that are autonomous and isolated requires a user to still manually position and orient the display devices. Therefore, the processor for each display device is only required to receive the portion of the overall view to be shown thereon.

Those skilled in the art will understand the advantages associated with aggregating display devices associated with a respective processor. Specifically, an aggregate display system that is specifically designed for such a purpose is no longer required. In another example, a larger surface is provided for the overall view to be shown. A plurality of tablets or laptops may be arranged such that the overall view may be shown thereon. That is, electronic devices having display devices that are ordinarily utilized for respective use (e.g., wholly inclusive within itself such as personal use) may also be utilized for an aggregate use. Accordingly, any electronic device having a display device may be included to provide a partial area of the overall view.

The exemplary embodiments of the present invention provide a system and method for automatically determining aligned edges for an aggregated display. The system comprises a first mobile unit (MU) positioned within a predetermined area, the first MU having a plurality of first edges. The first MU comprises at least one first active emitter disposed along each of the first edges, the first active emitter configured to transmit a first edge pattern and a second edge pattern; at least one first sensor disposed along each of the first edges, the first sensor configured to receive a third edge pattern and a fourth edge pattern; a first transceiver configured to transmit first wireless data in a first inter-device communication, the first wireless data being indicative of the first edge pattern, the first transceiver configured to transmit second wireless data in a second inter-device communication, the second wireless data being indicative of the second edge pattern; and a first display device. The system comprises a second MU positioned within the predetermined area, the second MU having a plurality of second edges. The second MU comprises at least one second active emitter disposed along each of the second edges, the second active emitter configured to transmit the third and fourth edge patterns; at least one second sensor disposed along each of the second edges, the second sensor configured to receive the first and second edge patterns; a second transceiver configured to receive the first and second wireless data, the first wireless data being further indicative of the third edge pattern, the second wireless data being further indicative of the fourth edge pattern; and a second display device. The first and second active emitters are configured to be activated to transmit the first and third edge patterns, respectively, as a function of the first inter-device communication such that, when one of the first sensors receives the third edge pattern and one of the second sensors receives the first edge pattern, one of the first edges in which the one of the first sensors is disposed and one of the second edges in which the one of the second sensors is disposed are aligned. The first and second active emitters disposed on the one of the first edges and the one of the second edges, respectively, are configured to be activated to transmit the second and fourth edge patterns, respectively, as a function of the second inter-device communication such that, when the one of the first sensors receives the fourth edge pattern and the one of the second sensors receives the second edge pattern, the one of the first edges and the one of the second edges are verified to be aligned. When the first and second MUs are in a verified aligned position, the first and second display devices are capable of forming an aggregated display.

The exemplary embodiments may be further understood with reference to the following description and the appended drawings, wherein like elements are referred to with the same reference numerals. The exemplary embodiments describe a system and method for automatically aggregating a plurality of display devices into a single logical display surface. Specifically, each display device is part of a respective electronic device including a plurality of components. The plurality of components of each electronic device may include a transceiver used to communicate with the other electronic devices and a set of sensors and emitters used to determine an alignment with a further electronic device. Specifically, the emitter is an active emitter that is controllable to transmit a signal that is received by a sensor of the further electronic device to determine whether the display devices of the electronic devices are properly aligned. The display devices, the aggregation thereof, the single logical display surface, the electronic device, the transceiver, the emitters/sensors, and related methods will be discussed in further detail below.

The exemplary embodiments provide a manner of fully automating an aggregation of display devices of co-located mobile units (MU) into a single larger display surface that may be used to display a larger image. As will be described in further detail below, emitters and sensors are integrated into each edge of a housing of each MU to facilitate a detection that an edge of a first MU is aligned with an edge of a second MU. The MUs communicate with each other such that a collaboration is used among the MUs via inter-device communication to confirm that edges of the MUs are aligned properly. Using the knowledge of which edges of which devices are aligned in the aggregation of the display devices of the MUs, the single logical display surface may be provided.

Figure 1:
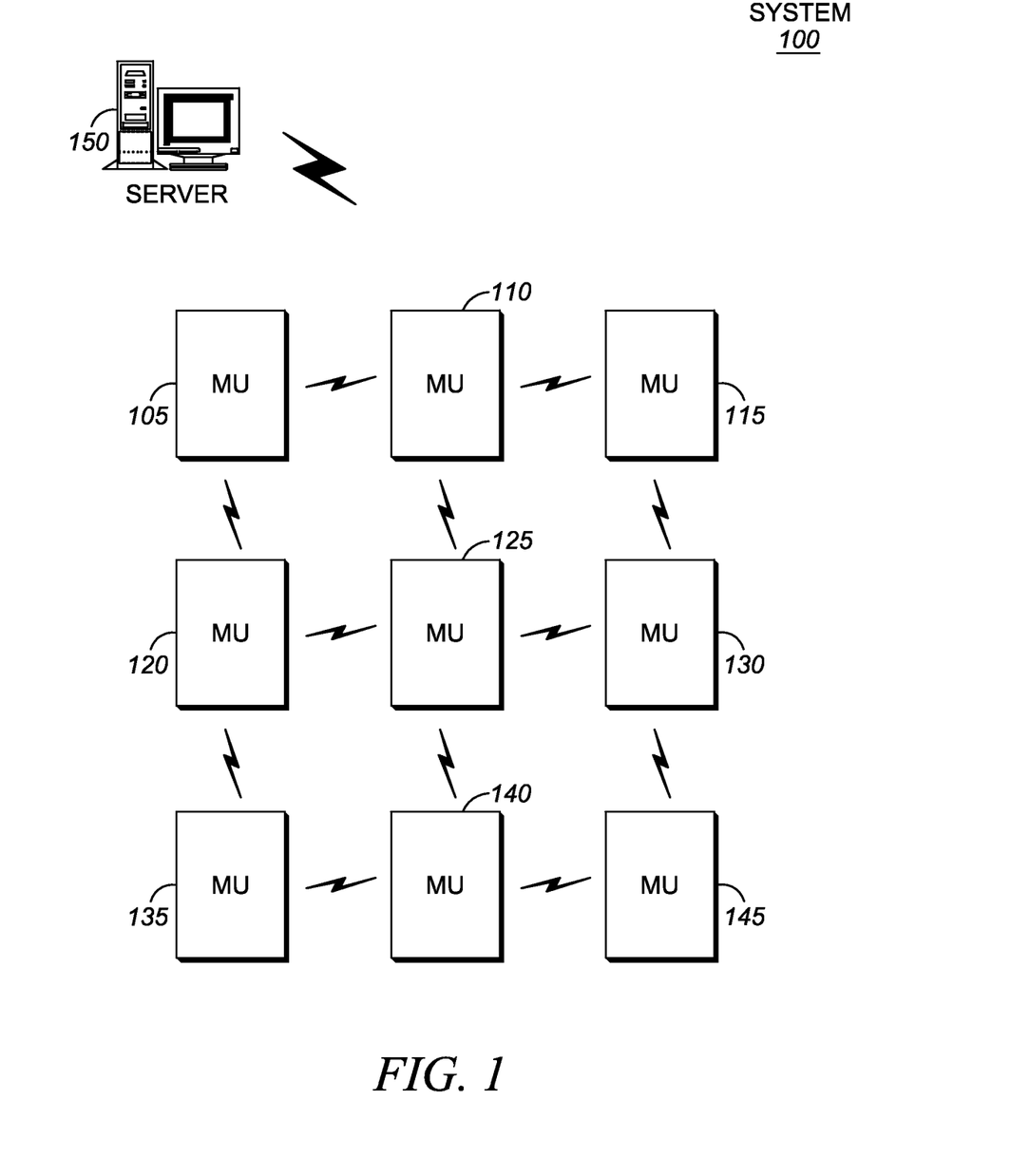
FIG. 1 shows a system of mobile units having a respective display device that are aggregated in accordance with some embodiments.

FIG. 1 shows a system 100 of mobile units (MU) 105-145 having respective display devices that are aggregated in accordance with some embodiments. As illustrated, the MUs 105-145 may be arranged in a shape that is subsequently used to show an overall image across the display devices of the MUs 105-145. As will be described in further detail below, each MU 105-145 may communicate with adjacent MUs to determine whether one of the MUs 105-145 are adjacent to one another and, if so, whether the display devices are properly aligned and oriented for the aggregate display. Accordingly, for the aggregate display to be ultimately provided, the MU 105 may communicate with MUs 110, 120; the MU 110 may communicate with MUs 105, 115, 125; the MU 115 may communicate with MUs 110, 130; the MU 120 may communicate with MUs 105, 125, 135; the MU 125 may communicate with MUs 110, 120, 130, 140, the MU 130 may communicate with MUs 115, 125, 145; the MU 135 may communicate with MUs 120, 140, the MU 140 may communicate with MUs 125, 135, 145; and the MU 145 may communicate with MUs 130, 140. It should be noted that given the "free space" environment in which the components of each MU operates and in which the MUs may be disposed, each MU may communicate with further MUs. For example, the MU 105 may be within a communicative distance to MU 125. However, the methods of the exemplary embodiments may be configured such that a communication between the MU 105 and the MU 125 may determine that these MUs are not neighboring MUs. Accordingly, the methods of the exemplary embodiments determine which MUs are appropriate neighbors by determining the proper position and orientation of each MU within the aggregate display.

FIG. 1 also shows a server 150. The server 150 may also be communicatively coupled to the MUs 105-145 such that data may be exchanged. The exemplary embodiments provide a first manner of providing the aggregate display in which the aggregate display is generated on an autonomous device. Specifically, one of the MUs 105-145 may be selected as a "master" device that coordinates the generation of the aggregate display. The exemplary embodiments provide a second manner of providing the aggregate display in which the aggregate display is generated by the server 150. Therefore, the server 150 serves a substantially similar functionality as the "master" device of the first manner. The first and second manner of aggregation therefore utilizes a "master" or controlling device.

In the first manner using the autonomous device-based display aggregation, each device may be supplied with local content that it presents or shows on its respective local display device. That is, each MU 105-145 is provided the data. The MUs 105-145 may communicate with each other to determine cooperatively how the display devices of the MUs 105-145 are to be properly aggregated. When a sufficient degree of aggregation has been detected, one of the MUs 105-145 may be designated as the "master" device to be responsible of the single larger display surface to be formed by the display devices that have been aggregated. Therefore, the "master" device may direct all aggregated display devices to present a portion of the overall view previously presented on the local display device of the "master" device (as received in the first step above), thereby resulting in the content of the "master" device to be shown on the larger logical display surface of the aggregated display.

In the second manner using the server-based display aggregation, each device may be communicatively coupled to the server. That is, the MUs 105-145 are all in communication with the server 150 which directs each MU 10-145 to present independent content (e.g., portion of overall view) on its local display device. The MUs 105-145 may again communicate with each other. However, in the second manner, the MU 105-145 generate position and orientation data and transmit this data to the server 150 to be used to determine how the display devices of the MUs 105-145 are to be properly aggregated. The server 150 may determine when a sufficient degree of aggregation has been achieved based upon the received data such that a single larger logical display surface is formed by the display devices of the MUs 105-145. The server 150 may then provide a respective portion of the overall view that is to be shown on each display device of the MUs 105-145.

Figure 2:
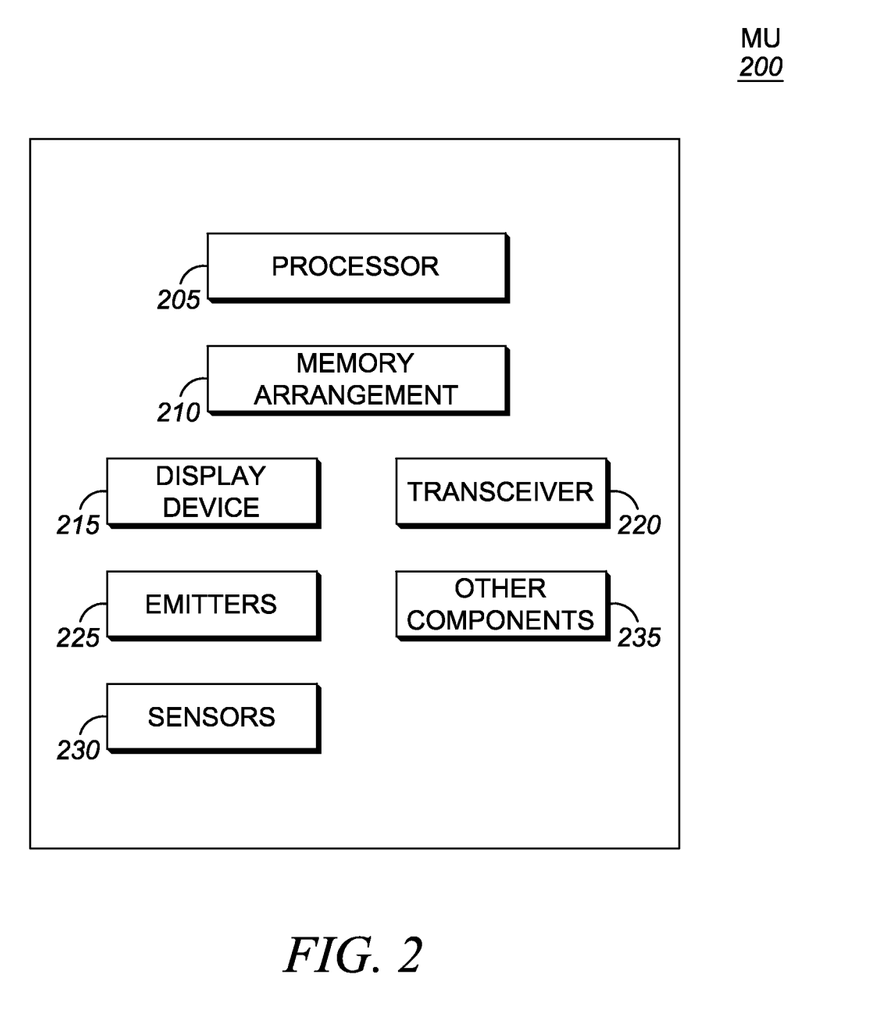
FIG. 2 shows components of the mobile units of the system of FIG. 1 in accordance with some embodiments.

As discussed above, each of the MUs 105-145 may be configured to communicate with each other in a collaborative effort. Accordingly, each MU 105-145 may include a plurality of components to enable this communication with relevant data related to the aggregated display. FIG. 2 shows components of a MU 200 which represents the MUs 105-145 of the system 100 of FIG. 1 in accordance with some embodiments. The MU 200 may include a processor 205, a memory arrangement 210, a display device 215, a transceiver 220, a plurality of emitters 225, a plurality of sensors 230, and other components 235. The other components 235 may be a portable power supply, coupling contacts, an audio output component, audio input component; etc.

The MU 200 may be any electronic device configured to communicate with other electronic devices and including the display device 215. For example, the MU 200 may be a laptop, a cellular phone, a smartphone, a personal digital assistant, a tablet, a barcode scanner, etc. The processor 205 may provide conventional functionalities such as executing a plurality of applications. Specifically, the processor 205 may be configured to provide the functionalities of a "master" device (when the first manner of display aggregation is performed). The memory 210 may also provide conventional functionalities such as storing the applications and other related data. Specifically, when the MU 200 is performing the functionalities of the "master" device, the MU 200 may store the position and orientation data from the other MUs.

The display device 215 may provide conventional functionalities in which image data is shown on a surface thereof. The display device 215 may be disposed relative to the components of the MU 200 such that the surface of the display device 215 occupies at least a portion of a face of a housing of the MU 200. For example, if the housing of the MU 200 is substantially a rectangular solid, the display device 215 may be disposed such that the surface is exposed on one of the six faces of the housing. The exposed surface of the display device 215 in which image data may be shown thereon may occupy a predetermined percentage of an overall area of the face of the housing. Since the MUs 105-145 (represented in MU 200) are to be used in an aggregated display, the exposed surface of the display device 215 may occupy an entirety of the area of the face of the housing. Depending on the other faces of the housing, this may allow the MUs 105-145 to be positioned such that the display devices 215 are adjacent one another with no significant gap therebetween. Accordingly, this provides an effect in which the overall view of the aggregated display may be seen by a viewer with no noticeable discontinuities between the MUs 105-145. In another example, the exposed surface of the display device 215 may occupy a significant majority of the face of the housing such that the housing itself of each MU 105-145 creates a negligible discontinuity in the overall view. This may relate to all sides of the face since it is possible that one of the MUs 105-145 may be in a position in which adjacent MUs are positioned on every side (when rectangular). For example, MU 125 is positioned in the aggregation in which MUs 110, 120, 130, 140 are each positioned on a respective side of the MU 125.

Figure 3A:
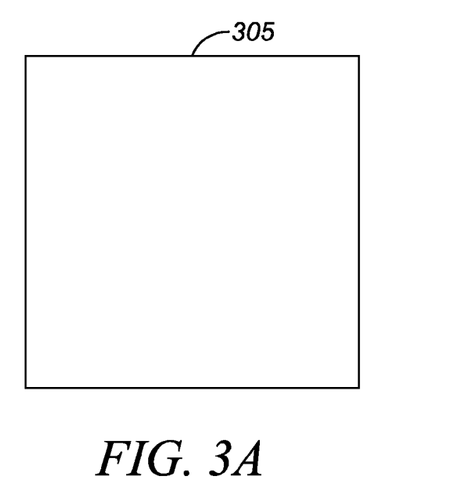
FIG. 3A-FIG. 3C show different shapes of the mobile units of the system of FIG. 1 in accordance with some embodiments.
Figure 3B:
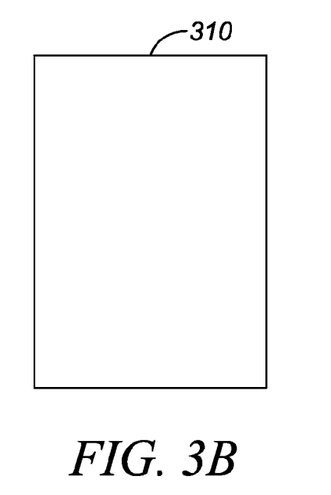
Figure 3C:
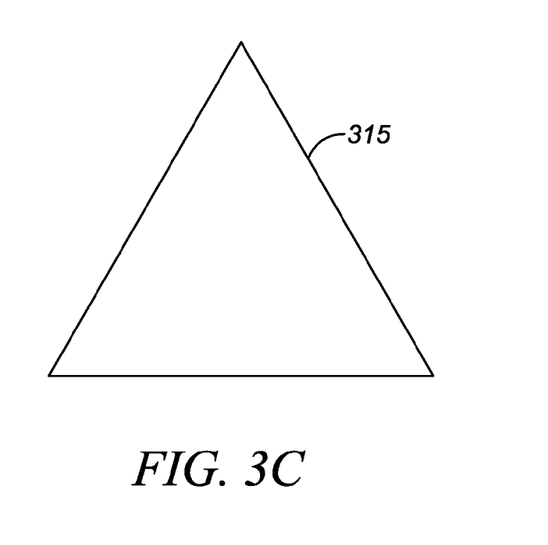

The display device 215 may be physically configured in a variety of manners. That is, the surface of the display device 215 on which image data is to be shown may have any shape. To minimize discontinuity areas in the aggregation between MUs 105-145, the housing and an overall shape of the MUs 105-145 may also coincide with the shape of the display device 215. FIG. 3A-FIG. 3C show different shapes of the MU 200 that represents the MUs 105-145 of the system 100 of FIG. 1 in accordance with some embodiments. For example, as shown in FIG. 3A, the MU 200 may have a shape 300 that is substantially square. Accordingly, the display device 215 may also have an exposed surface that is substantially square. In another example, as shown in FIG. 3B, the MU 200 may have a shape 310 that is substantially rectangular. Accordingly, the display device 215 may also have an exposed surface that is substantially rectangular. However, those skilled in the art will understand that a quadrilateral shape is only exemplary. As shown in FIG. 3C, the MU 200 may have a shape 315 that is substantially triangular (shown as equilateral but may also be isosceles or scalene). Accordingly, the display device 215 may also have an exposed surface that is substantially triangular. Other shapes may also be used such as pentagonal, hexagonal, etc. The exemplary embodiments may utilize any shape in which edges exist along the MU. It should be noted that the display device 215 having a substantially similar shape as the housing of the MU 200 is only exemplary. The shape of the exposed surface of the display device 215 and the housing of the MU 200 may be different. For example, the shape of the housing of the MU 200 may be substantially trapezoidal. However, the exposed surface of the display device 215 may be rectangular. It should also be noted that the MUs 105-145 being the same shape and size is only exemplary. As will be discussed in further detail below, the MUs 105-145 may be of any shape and any size and the exemplary methods are configured to incorporate different shape/size MUs into the aggregate display.

It should be noted that the use of the MU is only exemplary. The exemplary embodiments relate to aggregating display devices. Accordingly, the MU may represent any electronic device that includes or is coupled to a display device. For example, the MU described herein may represent each of a plurality of terminals that are respectively coupled to a monitor. The monitors may be then be aggregated.

Returning to FIG. 2, the transceiver 220 may provide conventional functionalities in which data is transmitted and received with a further electronic device. According to the exemplary embodiments, the transceiver 220 may be configured to communicate with other electronic devices that are involved in the aggregate display. Accordingly, since the MUs 105-145 are co-located and within a relatively small distance from one another, the transceiver 220 may be a short range transceiver such as one utilizing a BlueTooth technology. If the server 150 is also co-located, the short range transceiver 220 may also communicatively exchange data with the server 150. However, it should be noted that the transceiver 220 may also be a long range transceiver such as one utilizing WiFi technology (e.g., IEEE 802.11a/b/g/n/ac technology or any other wireless communication technology). For example, when the server 150 is remotely located at least a distance that is outside the range of the short range transceiver, the transceiver 220 may still be configured to communicatively exchange data with the server 150. Accordingly, the transceiver 220 may represent a transceiver arrangement in which a first portion or first transceiver may enable short range communication while a second portion or second transceiver may enable long range communication.

The emitters 225 may be active emitters that are controlled by the processor 205 regarding when to activate and the manner in which to activate. Specifically, the processor 205 determines the type of signal that is transmitted from the emitters 225. The emitters 225 may be any type of component configured to transmit a signal. For example, the emitters 225 may be a magnetic or inductive type, an optical signal generator, an audio signal generator, may utilize electrical contacts, etc. The sensors 230 may be corresponding types to the emitters 225. The sensors 230 are configured to receive the signal transmitted from the emitters 225. Accordingly, the sensors 230 may also be of a magnetic or inductive type, an optical signal receiver, an audio signal receiver, corresponding electrical contacts, etc. Through the emitters 225 and the sensors 230, a determination of whether a proper alignment of the edges of the MUs has been achieved may be provided as well as a relative proximity of the edges of the MUs to one another. The emitters 225 and the sensors 230 will be described in further detail below.

Figure 4A:
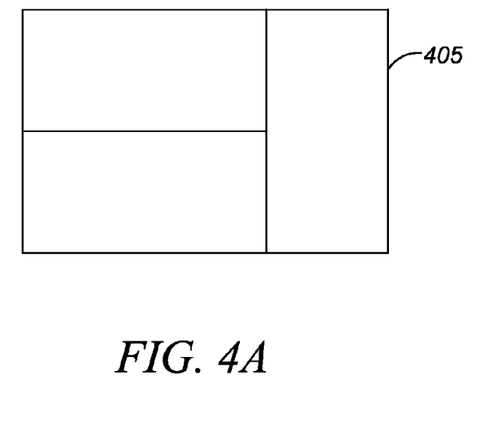
FIG. 4A-FIG. 4D show different aggregation configurations for the system of FIG. 1 in accordance with some embodiments.
Figure 4B:
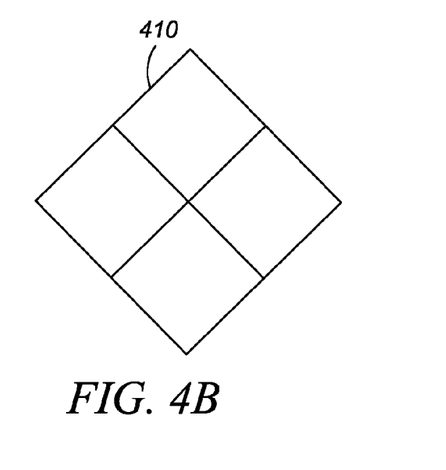
Figure 4C:
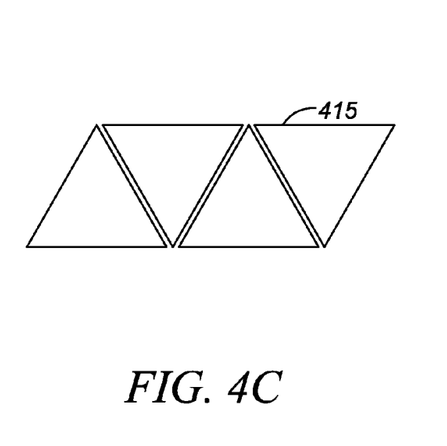
Figure 4D:
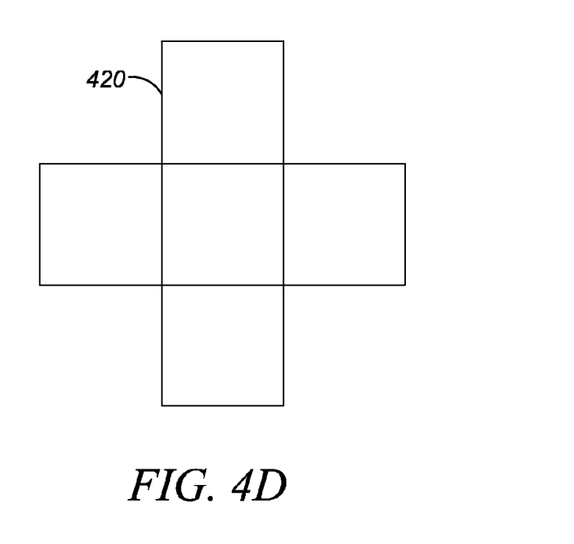

The aggregate display including a plurality of display devices 215 may be arranged in a variety of different overall shapes. FIG. 4A-FIG. 4D show different aggregation configurations for the system 100 of FIG. 1 in accordance with some embodiments. In FIG. 1, an overall shape may be substantially rectangular. Specifically, nine total MUs 105-145 are used in the aggregate display. Accordingly, the MUs 105-145 may be arranged in three columns and three rows to create the substantially rectangular aggregate display. In FIG. 4A, an overall shape 405 may also be substantially rectangular. Each of the MUs involved in the aggregate display may also be substantially rectangular in a similar manner as FIG. 1. However, FIG. 4A illustrates that the MUs are not required to all be oriented in a substantially similar manner. That is, two MUs are positioned along their length while one MU is positioned along its height. In FIG. 4B, an overall shape 410 may be substantially a diamond shape. If rotated 45°, the overall shape 410 may represent a substantially similar shape as that of FIG. 1 and FIG. 4A (substantially rectangular). FIG. 4B illustrates that the MUs are not required to be positioned at right angles. The orientation of the MUs will be discussed in further detail below. In FIG. 4C, an overall shape 415 may be a substantially quadrilateral shape or trapezoidal shape. As discussed above, the MUs and/or the display devices may have different shapes. In FIG. 4C, each of the MUs have a substantially triangular shape. By positioning the MUs as illustrated, the overall shape 415 may be a substantially quadrilateral shape. If one end MU is removed, the overall shape 415 may be changed to a substantially trapezoidal shape. Further MUs may be introduced such that the overall shape 415 may further be changed such as into a substantially triangular shape. In FIG. 4D, an overall shape 420 may be a substantially cross shape. FIG. 4D illustrates that edges of the MUs may be aligned in a variety of manners using any permutation.

As discussed above, the display devices 215 and/or the MU 200 itself may be of various shapes and sizes. The methods of the exemplary embodiments provide for a manner of utilizing MUs having substantially similar shapes and sizes as well as MUs having different shapes and sizes to be included in the aggregate display. The MU 200 is configured to communicate with the other MUs of the aggregate display as well as a "master" device which may be designated among the MUs of the aggregate display (first manner of aggregation) or may be to a server (e.g., server 150) (second manner of aggregation). When communicating with the "master" device, the MUs may indicate the shape and size of the respective display device. Furthermore, the MUs may indicate the shape and size of the housing, the relative positions of the emitters/sensors within the housing, etc. In this way, the "master" device is aware of the shapes/sizes of the relative components of the MUs as well as their disposition/orientation in order to determine the aggregate display appropriately. Also as discussed above, the display devices 215 and/or the MU 200 may be oriented at different angles. The other components 230 of the MU 200 may therefore include components to determine orientation. For example, a magnetometer (e.g., a compass), an accelerometer (e.g., 3-axis), ambient light sensor, a camera, etc. may be used to determine a relative orientation of the MU 200. This orientation data may also be transmitted to the "master" device. In this manner, the shape of the display device 215, the size of the display device 215, the orientation of the display device 215, and the aforementioned proximity of the edges of adjacent MUs may be known by the "master" device.

It should be noted that the exemplary embodiments for aggregating displays relate to satisfying a set of criteria to determine whether the plurality of display devices are sufficient for aggregation. A first criterion may be whether there are discontinuities. The discontinuity may relate to whether a space or gap exists between the display devices but may also relate to whether the display devices are aligned. As discussed above, the display device 215 may be sized and shaped such that little to no discontinuity exists with an adjacent display device. However, the exemplary methods may utilize a predetermined discontinuity value (e.g., within 10 mm with a variance of no more than 2 mm) to determine whether an existing discontinuity renders the aggregate display insufficient. The methods of the exemplary embodiments relate initially to aligning edges of the MUs. However, the display device 215 may not share a common orientation with the edges of the MU. Accordingly, the edges of adjacent display devices 215 may not necessary align when the edges of adjacent MUs 200 align. The exemplary methods incorporate any discontinuity that may exist in determining whether a sufficient aggregate display may be provided.

A second criterion may be whether an overall shape of the aggregate display is sufficient. That is, certain shapes of the aggregate display may be outside predetermined tolerances. A first consideration for the second criterion is whether the orientation of the MUs 200 are outside an orientation tolerance (e.g., 0°, 90°, 180°, 270° all of which are ±5°). For example, when the MUs and the display devices have a substantially rectangular shape, an acceptable orientation of the MUs is along right angles. If the MUs are positioned such that the display devices are slanted, such an orientation may lie outside the orientation tolerance. A second consideration for the second criterion is whether the alignment is outside an alignment tolerance (e.g., 95% or better alignment). For example, if identically shaped and sized MUs are positioned adjacent each other but offset (e.g., one MU is higher than the other MU), the edges may be aligned but only along a portion of an overall length of the edge. When the MUs are offset by more than a predetermined amount, the alignment may be outside the alignment tolerance. A third consideration for the second criterion is whether the overall shape itself is acceptable. For example, any overall shape in which there is a hole or major discontinuity may be unacceptable for the aggregate display. A U-shape formed by the MUs has a major discontinuity while a D-shape formed by the MUs has a hole therein. Such shapes may be considered outside a continuity tolerance. In another example, the overall shape may not include a hole or major discontinuity but may still be unacceptable for the aggregate display. For example, if the MUs have a substantially triangular shape and the MUs are arranged in a substantially trapezoidal shape, if the overall shape should be oriented such that one of the non-parallel sides is a bottom side, this overall shape may be considered unacceptable. A fourth consideration for the second criterion is a total number of display devices. Although a maximum number of display devices may not exist for the exemplary embodiments, if only one or two display devices are present, such a scenario may be unacceptable for the aggregate display. In this respect, the exemplary methods incorporate this data in determining whether a sufficient aggregate display may be provided.

It should be noted that the above criteria may relate to a given moment in time. That is, each criterion may be for generating the aggregate display with regard to a particular rendering of the aggregate display. However, a further criterion that may be considered in generating the aggregate display is a temporal factor. For example, the image to be shown on the aggregate display may be dynamic. That is, a first image may be shown on the aggregate display for a predetermined amount of time followed by a second image, etc. Accordingly, with each image or types of image (e.g., size of image), the aggregate display may be updated accordingly. For each rendering of an image on the aggregate display, the above criteria may be utilized. Furthermore, with each image utilizing a respective aggregate display for the predetermined amount of time, the system may consider the temporal factor. For example, the display devices may be moved in a predetermined pattern or as a function of a set of images to be shown. When this occurs, the system may consider when the display devices are aggregated for a predetermined minimum amount of time. When the display devices have been determined to be aggregated for the predetermined amount of time, then the image may be shown thereon. By incorporating the temporal factor, this may eliminate confusion or rendering of incoherent partial images on each display device.

It should also be noted that the display devices may utilize an "alignment image" which is indicative of whether two adjacent display devices are properly aligned. That is, the "alignment image" may be shown on these two adjacent display devices. Accordingly, the "alignment image" may provide positive feedback that the display devices are indeed properly aligned. Furthermore, when two adjacent display devices are partially aligned (i.e., sufficient for alignment but not properly aligned), a different "misalignment image" may be shown on these display devices. Accordingly, the "misalignment image" may provide negative feedback that the display devices are not properly aligned. This negative feedback may be indicative that the display devices or the MUs with these display devices require a physical adjustment such that a proper alignment is achieved. The negative feedback may also include constructive feedback such as a manner in which the MUs should be physically adjusted. For example, the portion of the "misalignment image" shown on a first display device may include arrows indicating how the MU should be moved.

Figure 5:
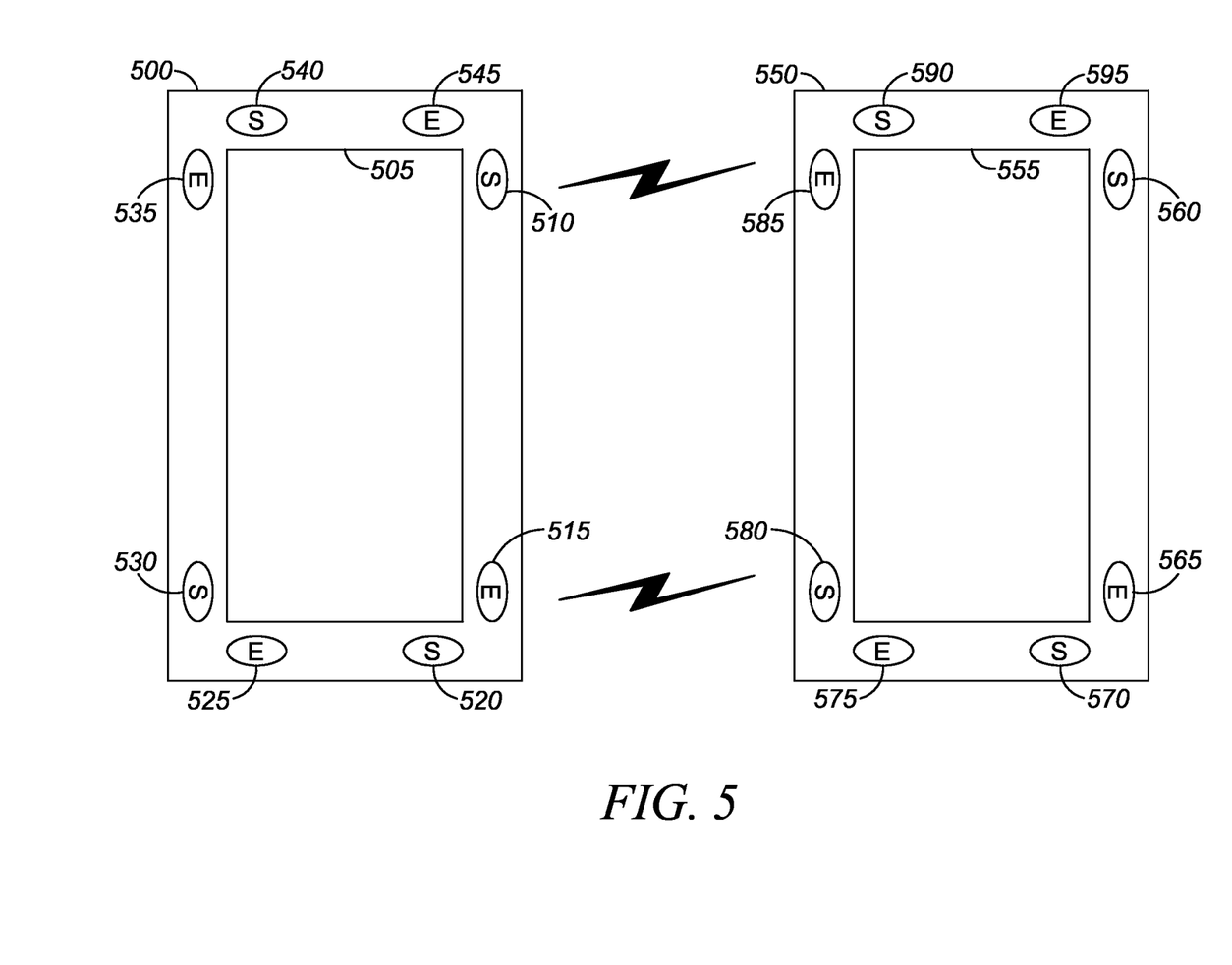
FIG. 5 shows two mobile units of the system of FIG. 1 determining an alignment for the aggregation in accordance with some embodiments.

FIG. 5 shows two MUs 500, 550 representative of two of the MUs 105-145 of the system 100 of FIG. 1 determining an alignment for the aggregation in accordance with some embodiments. The MUs 500, 550 may have a substantially rectangular shape in which a display device is disposed. Specifically, the MU 500 may include the display device 505 while the MU 550 may include the display device 555. As discussed above, the MUs 500, 550 may include a plurality of emitters 225 and a plurality of sensors 230. Since the edges of the MUs 500, 550 are to be aligned with each other and potentially with further MUs, a pair of one emitter and one sensor may be disposed on each edge. As shown in FIG. 5, the emitters 225 and the sensors 230 may be disposed near an edge of the MU, specifically between the display device and the edge. Specifically, the MU 500 may include a sensor 510 and an emitter 515 on a first side (long right side), a sensor 520 and an emitter 525 on a second side (short bottom side), a sensor 530 and an emitter 535 on a third side (long left side), and a sensor 540 and an emitter 545 on a fourth side (short top side). However, it should be noted that the sensors and the emitters being disposed between the edge and the display device is only exemplary and shown only for illustrative purposes. As there is a third dimension to the MUs 500, 550, the sensors and the emitters may be disposed underneath the display devices. It should also be noted that the pair including only a single emitter and a single sensor is only exemplary as further emitters and further sensors may be disposed along a single edge. In a substantially similar manner as the MU 500, the MU 550 may include a sensor 560 and an emitter 565 on a first side (long right side), a sensor 570 and an emitter 575 on a second side (short bottom side), a sensor 580 and an emitter 585 on a third side (long left side), and a sensor 590 and an emitter 595 on a fourth side (short top side).

According to the exemplary embodiments, a pair of MUs 500, 550 may communicate between each other to determine whether an edge of the first MU 500 is aligned with an edge of the second MU 550. As shown in FIG. 5, the right edge of the MU 500 may be aligned with the left edge of the MU 500. To determine if the edges are properly aligned, the emitter 515 may be activated to transmit a signal that is to be received by the sensor 580 while the emitter 585 may be activated to transmit a signal that is to be received by the sensor 510. The MUs 500, 550 may determine whether a proper alignment exists based upon the receiving of the signals and inter-device communication. Specifically, the transceiver of the MUs 500, 550 may indicate to one another when a signal is to be transmitted on its respective emitter. When the other MU 500, 550 receives the signal, the MUs 500, 550 may be aware of orientation, proximity, etc. between the MUs 500, 550. For example, a signal strength or time to receive the signal may be used as a basis to determine the orientation and proximity of the edges. If the above noted criteria have been satisfied, the MUs 500, 550 may determine that the edges thereof are properly aligned for the aggregate display. It is noted that the exemplary embodiments further provide a manner for the MUs 500, 550 to determine which edges are aligned prior to verifying that the edges are properly aligned.

The type of signal to be transmitted via the emitters may be dependent on a variety of factors. In a first example, the type of emitter may indicate the type of signal to be transmitted. Thus, an optical emitter may transmit a laser while an audio emitter may transmit a sound. In a second example, between common types of emitters, the signal may also vary. Thus, a first optical emitter may transmit a laser using a first frequency (or pulse) while a second optical emitter may transmit a laser using a second frequency (or pulse). The MUs 500, 550 may communicate between each other to indicate the type of signal that will be transmitted such that the other MU 500, 550 may properly determine whether the edges of the MUs 500, 550 (and not a further MU) is properly aligned. Each pair of MUs of the system may perform the above manner of determining proper alignment to ultimately determine the aggregate display.

As the exemplary methods relate to a plurality of display devices and respective MUs, the timing of the transmission of signals may also vary. In a first example, if the type of emitter is common throughout all the MUs and only a single type of signal is utilized, the MUs may coordinate such that only two MUs at a given time are determined to be properly aligned. In a second example, if the type of emitter is different (e.g., top and bottom emitters utilize a first emitter while the left and right emitters utilize a second emitter), the MUs may coordinate such that different pairs of MUs are determined to be properly aligned. In a third example, if different types of signals are utilized (e.g., different frequencies), the MUs of the entire system may transmit signals concurrently to decrease an overall time required to determine whether pairs of edges from two different MUs are properly aligned.

The exemplary embodiments provide an automatic manner of determining an aggregate display based upon active emitters, sensors, and collaboration between the MUs. The MUs may be positioned manually by a user in a given space such that the MUs are co-located. A command may then be transmitted to the MUs to initiate the display aggregation.

An initial step in determining proper edge alignment with adjacent MUs is determining the identities of the MUs. As discussed above, the MU 200 (and therefore the MUs 105-145) may include the transceiver 220. The transceiver 220 of a first MU may utilize any known discovery process to determine the co-located MUs. For example, a probe request may be broadcast radially. MUs within range of the broadcast, specifically co-located ones, may receive the probe request and transmit a probe response. In this manner, the transceiver 220 of the MU 200 may receive the probe responses to determine the co-located MUs. It should be noted that the discovery process may be performed in a variety of manners. In a first exemplary discovery process, a first MU may transmit a probe request. In a specific scenario, with four total MUs, a first MU may broadcast the probe request and receive three probe responses from the other MUs. Thus, the first MU is aware that three other MUs are co-located. The first MU may then transmit a data packet to the three other co-located MUs indicating the presence of all co-located MUs. To guarantee the discovery of all co-located MUs, every other MU may repeat this process. If a data packet indicates a discrepancy from other data packets, this may indicate an erroneous discovery or may be indicative of a relative distance (if the probe request does not reach the MU of the discrepancy). In a second exemplary discovery process, the server 150 may broadcast a probe request in a general vicinity in which the MUs are co-located and receive a probe response from these co-located MUs. The server 150 may subsequently broadcast a data packet to the co-located MUs indicating the existence of all the co-located MUs. It should be noted that each MU also includes the processor 205. The processor 205 may be configured to execute a detection application that performs the above noted step of discovering the other co-located MUs.

The following description relates to determining the sufficiency of the edge alignment between the MU 125 and the MU 130. That is, the right edge of the MU 125 aligns with the left edge of the MU 130. Accordingly, the exemplary embodiment of FIG. 5 will be used in the following description in which the right edge of the MU 500 aligns with the left edge of the MU 550. Therefore, the MU 125 of the system 100 of FIG. 1 corresponds to the MU 500 of FIG. 5 while the MU 130 of the system 100 of FIG. 1 corresponds to the MU 550 of FIG. 5.

Since the MU 500 and the MU 550 have discovered each other or are aware of each other's presence in the co-located area, the MU 500 and the MU 550 may then communicate with each other to determine which edges are aligned for these two MUs. The MUs 500, 550 may communicate with one another and determine an edge detection pattern to be used via the emitters 515, 525, 535, 545 and the emitters 565, 575, 585, 595, respectively. That is, the edge detection pattern is transmitted on some or all emitters of both MUs 500, 550. As discussed above, the emitters may utilize a particular type of signal or a particular form of signal. The types and forms of the signals will be discussed in further detail below. It should be noted that the edge detection pattern for the emitters may be the same or may also be different. For example, if a common edge detection pattern is utilized, select emitters may be activated such that the identity of aligned edges may be determined. In another example, if different edge detection patterns are utilized, the emitters may be activated concurrently since sensors are configured to receive a known edge detection pattern. Thus, the edges may be determined to be aligned only if the intended, known edge detection patter is received. In yet another example, the MUs may utilize a sequence through the emitters serially with a common or different edge detection pattern. It is noted that so long as the MUs operate collaboratively through inter-device communication, the emitters and sensors may be utilized using any manner of common or different edge detection patterns. Upon determining the edge detection pattern, the emitters may be activated by the processor of the MUs 500, 550.

In a first outcome, if either the MU 500 or the MU 550 determine that the edge detection pattern is not received on the any of the sensors 510, 520, 540, 540 of the MU 500 or the sensors 560, 570, 580, 590 of the MU 550, then the MUs 500, 550 may conclude that the edges are not aligned. In fact, the MUs 500, 550 may reasonably conclude that these MUs are not even adjacent.

In a second outcome, if either the MU 500 or the MU 550 determines that the edge detection pattern is received on more than one sensor, the MUs 500, 550 may determine that a different edge detection pattern is required. Specifically, there may be interference from the other co-located MUs that causes the selected edge detection pattern to be received on multiple sensors. For example, the MU 110 or the MU 140 of the system 100 (when related to MUs 125, 130) may cause interference. Accordingly, multiple sensors of either the MUs 500, 550 may receive the edge detection pattern. Therefore, the MUs 500, 550 may again communicate to determine a further edge detection pattern to be used. The further edge detection pattern may be used in a substantially similar manner as the first selected edge detection pattern. As the type of emitters and sensors used may relate to different forms of interference as well as the likelihood that interference is present, using further edge detection patterns in this manner may verify with greater accuracy that the edges are aligned and may also eliminate possible false positives.

In a third outcome, if both the MU 500 and the MU 550 determine that the edge detection pattern is received on a single respective sensor (and only one sensor), then the MUs 500, 550 may determine which edges are likely to be aligned. That is, the MUs 500, 550 may determine that the right edge of the MU 500 is aligned with the left edge of the MU 550.

Thus, when considering the MUs 105-145 of the system 100 of FIG. 1, the MUs 105-145 may utilize the edge detection pattern to determine adjacent MUs and also the edges that are likely to be aligned. For example, the MU 125 may determine that the neighboring MUs include MUs 110, 120, 130, 140. The MU 125 may also determine that a top edge is aligned with a bottom edge of the MU 110, a left edge is aligned with a right edge of the MU 120, a right edge is aligned with a left edge of the MU 130, and a bottom edge is aligned with a top edge of the MU 140. In another example, the MU 105 may determine that the neighboring MUs include MUs 110, 120. The MU 105 may also determine that a right edge is aligned with a left edge of the MU 110 and a bottom edge is aligned with a top edge of the MU 120.

Once the MUs 500, 550 have determined that these MUs are adjacent one another and which edges are aligned, the MUs 500, 550 may again communicate with one another to verify that the right edge of the MU 500 is aligned with the left edge of the MU 550. The MUs 500, 550 determine an edge verification pattern to use on the emitters of the edges that are aligned. Therefore, the edge verification pattern is transmitted on the emitters 515, 585. If properly aligned, the sensors 510, 580 should receive the edge verification pattern from the emitters 585, 515, respectively. It should be noted that the edge verification pattern may also be used in a substantially similar manner as the edge detection pattern, particularly regarding a timing issue. For example, when different patterns are used, the edge verification pattern may be utilized at a similar time that a different edge verification pattern is used for different edges (with a further MU) or at a similar time that an edge detection pattern is used. Through the inter-device communications between the MUs, the collaboration may enable the various different patterns to be utilized, concurrently, at different times, serially, etc. It should be noted that the edge detection pattern may be a pattern that is more appropriately used for detecting aligned edges while the edge verification pattern may be a pattern that is more appropriately used for verifying as well as determining sufficiency in the edges being aligned. For example, the edge detection pattern may be an easily recognizable pattern that is readily distinguishable from other patterns (when multiple different patterns are used). In another example, the edge verification pattern may use simpler patterns that enable a more fine-grained detection such as based on signal strength which is easier to determine for less variable signals.

In a first outcome, one or both of the sensors 510, 580 may not receive the edge verification pattern. If both the sensors 510, 580 indicate that the edge verification pattern is not received, the MUs 500, 550 may conclude that the edges are not aligned. However if only one of the sensors 510, 580 indicate that the edge verification pattern is not received, the MUs 500, 550 may still conclude that the edges are not aligned. For example, the MUs 500, 550 may be adjacent one another. However, the orientation of the MU 550 may be different from the orientation of the MU 500 (e.g., the MUs 500, 550 are not positioned on a common plane). Therefore, if the MU 550 is positioned to be angled downward on its bottom edge with respect to the MU 500, the sensor 510 may still receive the edge detection pattern from the emitter 585. However, the sensor 580 may not receive the edge detection pattern from the emitter 515. As discussed above, an orientation tolerance is one criterion to determine the sufficiency of edge alignment. When the sensor 580 does not receive the edge detection pattern, this may indicate that the MUs 500, 550 are outside the orientation tolerance.

In a second outcome, both sensors 510, 580 may receive the edge verification pattern from the emitters 585, 515, respectively. When this occurs, the MUs 500, 550 may have verified that the right edge of the MU 500 is properly aligned with the left edge 550. It should be noted that the above described criteria may be also be assessed when the sensors 510, 580 receive the edge verification pattern. For example, if an audio emitter is used, the emitters 515, 585 may transmit an audio signal having the selected edge verification pattern. If the sensors 510, 580 receive the audio signal but the sensors 510, 580 also measure a signal strength (e.g., decibel level), the signal strength should be substantially similar if the edges are properly aligned. When a discrepancy in the signal strength is outside a predetermined tolerance, the MUs 500, 550 may still conclude that the edges are not properly aligned despite the sensors 510, 580 receiving the edge verification pattern.

Accordingly, the MUs 500, 550 may determine edge alignment using the above described steps. Specifically, a first step is establishing a communicative connection for inter-device communication. A second step may be detecting edges that are aligned between the MUs 500, 550. Therefore, an edge detection pattern may be selected by the MUs 500, 550. The edge detection pattern may be transmitted on all emitters of both MUs. When the edge detection pattern is received on only sensor of both MUs, the edges that are aligned may be determined. Thus, a third step may be verifying that the detected edges are aligned. Therefore, an edge verification pattern may be selected by the MUs 500, 550. The edge verification pattern may be transmitted on the emitters of the detected edges. When the edge verification pattern is received on only the sensor of the detected edges, the edges may be determined to be aligned. In a fourth step, the MUs 500, 550 may determine a sufficiency of the verified edges. Specifically, the above noted criteria may be analyzed to determine that the verified edges are indeed properly aligned to a degree sufficient for display aggregation.

As discussed above, the emitters and the sensors may be of a variety of different types. Specifically, the emitters may be active emitters that may be activated or deactivated in a known manner based upon signals received from the processor. For example, the emitters may be electromagnets while the sensors may be hall effect sensors; the emitters may be optical emitters while the sensors may be optical sensors; the emitters may be audio emitters while the sensors may be audio sensors; the emitters may be electrical contacts while the sensors may be electrical connectors; etc. The following provides how these different forms of emitters/sensors are used for the above described edge alignment.

In a first example, the emitters may be electromagnets while the sensors may be hall effect sensors. The hall effect sensors may be configured to determine when the electromagnet is within a close proximity. As an electromagnet, those skilled in the art will understand that this is an active emitter as the magnetic field generated thereby may be activated or deactivated. Thus, the emitters 515, 525, 535, 545 of the MU 500 and the emitters 565, 575, 585, 595 of the MU 550 may be electromagnets while the sensors 510, 520, 530, 540 of the MU 500 and the sensors 560, 570, 580, 590 of the MU 550 may be hall effect sensors. Assuming the inter-device communication is established, the electromagnets of the MUs 500, 550 may be activated using the edge detection pattern. Subsequently, the electromagnets of the MUs 500, 550 for the detected edges may be activated using the edge verification pattern. The edge detection pattern or the edge verification pattern may be, for example, a strength of the field, a pattern of on/off detections, etc.

In a second example, the emitters may be optical emitters while the sensors may be optical sensors. The optical sensors may be configured to receive an optical signal from the optical emitters. As an optical emitter, those skilled in the art will understand that this is an active emitter as the optical signal generated thereby may be activated or deactivated. Thus, the emitters 515, 525, 535, 545 of the MU 500 and the emitters 565, 575, 585, 595 of the MU 550 may be optical emitters while the sensors 510, 520, 530, 540 of the MU 500 and the sensors 560, 570, 580, 590 of the MU 550 may be optical sensors. Assuming the inter-device communication is established, the optical emitters of the MUs 500, 550 may be activated using the edge detection pattern. Subsequently, the optical emitters of the MUs 500, 550 for the detected edges may be activated using the edge verification pattern. The edge detection pattern or the edge verification pattern may be, for example, emissions in different frequencies, a sequence of frequencies, a pattern of on/off detections, etc.

In a third example, the emitters may be audio emitters while the sensors may be audio sensors. The audio sensors may be configured to receive an audio signal from the audio emitters. As an audio emitter, those skilled in the art will understand that this is an active emitter as the audio signal generated thereby may be activated or deactivated. Thus, the emitters 515, 525, 535, 545 of the MU 500 and the emitters 565, 575, 585, 595 of the MU 550 may be audio emitters while the sensors 510, 520, 530, 540 of the MU 500 and the sensors 560, 570, 580, 590 of the MU 550 may be audio sensors. Assuming the inter-device communication is established, the audio emitters of the MUs 500, 550 may be activated using the edge detection pattern. Subsequently, the audio emitters of the MUs 500, 550 for the detected edges may be activated using the edge verification pattern. The edge detection pattern or the edge verification pattern may be, for example, emissions in different frequencies, a sequence of frequencies, a pattern of on/off detections, etc.

In a fourth example, the emitters may be electrical contacts while the sensors may be electrical connectors. The electrical connectors may be configured to receive a connection signal from the electrical contacts. As an electrical contact, those skilled in the art will understand that this is an active emitter as the connection signal generated thereby may be activated or deactivated. Thus, the emitters 515, 525, 535, 545 of the MU 500 and the emitters 565, 575, 585, 595 of the MU 550 may be electrical contacts while the sensors 510, 520, 530, 540 of the MU 500 and the sensors 560, 570, 580, 590 of the MU 550 may be electrical connectors. Assuming the inter-device communication is established, the electrical contacts of the MUs 500, 550 may be activated using the edge detection pattern. Subsequently, the electrical contacts of the MUs 500, 550 for the detected edges may be activated using the edge verification pattern. The edge detection pattern or the edge verification pattern may be, for example, a physical contact between the electrical contacts and the electrical connectors.

Figure 6A:
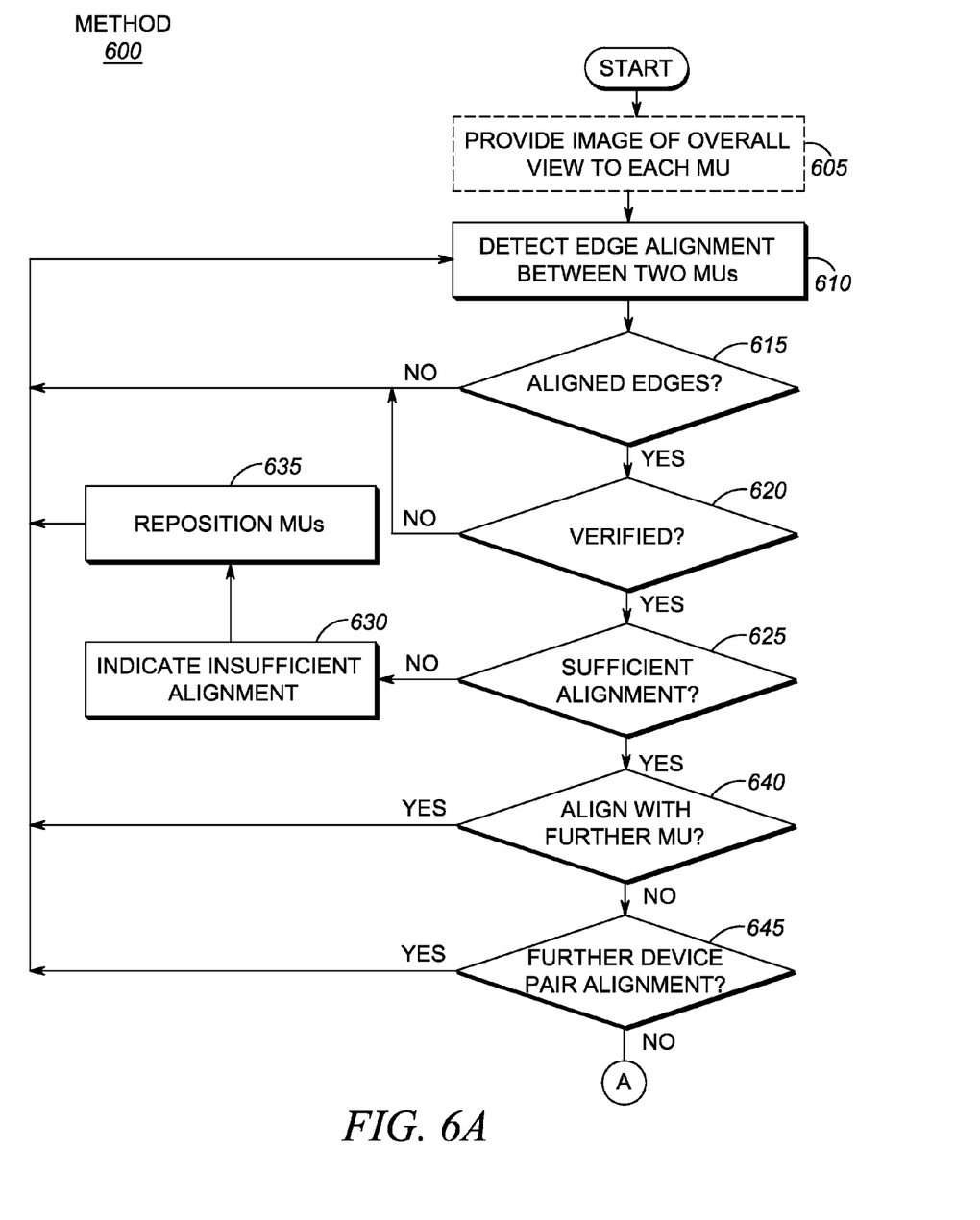
FIG. 6A and FIG. 6B show a method of aggregating a plurality of display devices in accordance with some embodiments.
Figure 6B:
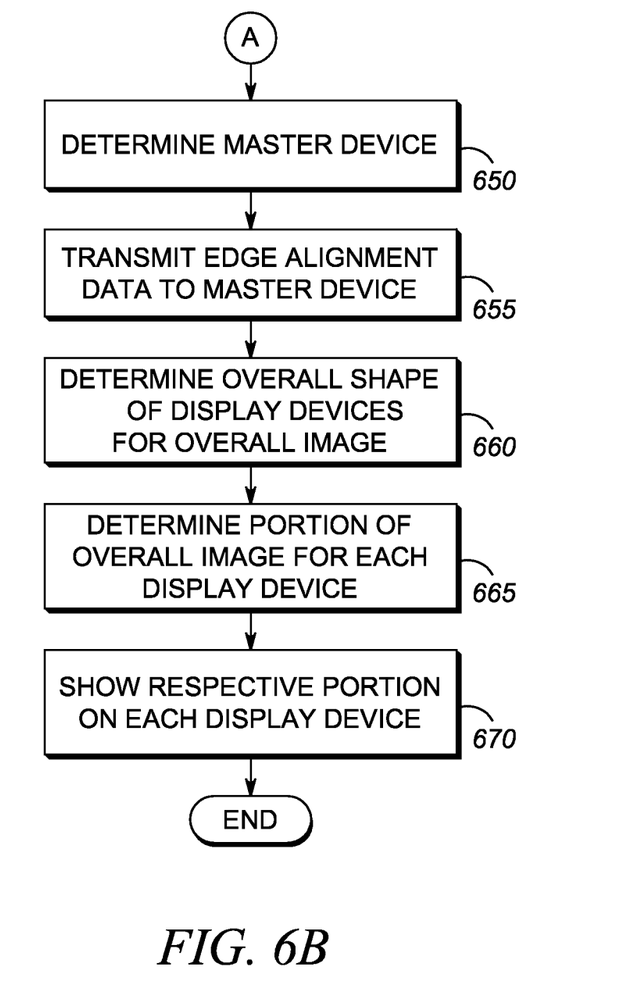

FIGS. 6A and 6B show a method 600 of aggregating a plurality of display devices in accordance with some embodiments. The method 600 relates to an overall manner to determine an aggregation for all co-located MUs having respective display devices. The method 600 further relates the two above described manners of aggregation in which a "master" device (herein "controlling device") is utilized, in which the controlling device is one of the MUs of the system or a separate server. The method 600 will be described with reference to the system 100 of FIG. 1, the components of the MU 200 of FIG. 2, and the emitters/sensors of the MUs of FIG. 5. It should be noted that it may be assumed that the MUs 105-145 have been manually positioned prior to the method 600 starting. It may also be assumed that the MUs 105-145 may be re-positioned manually at any given time.

Depending on the manner of aggregation, a first optional step 605 may be to provide an image for the overall view to each MU. Specifically, when the controlling device is selected as one of the MUs 105-145 of the system 100, the image may be provided to each MU. However, when the controlling device is the server 150, the image may not be provided to each MU in a preliminary step.

In step 610, two MUs detect an edge alignment between each other. That is, the processor 205 of the MU 200 executes the edge alignment application to determine whether a proper alignment of detected edges exist between the two MUs. Accordingly, in a first process, the two MUs may establish a communicative link such that they are configured to communicate with one another via the transceiver 215.

In step 615, a determination is made whether there are aligned edges between the two MUs. For example, with the MUs 500, 550 of FIG. 5, these MUs communicate with one another and determine an edge detection pattern. All the emitters for both MUs 500, 550 may transmit the edge detection pattern in order to determine if any of the edges are aligned. If no edges are aligned (e.g., edge detection pattern is not detected on any of the sensors), then the method 600 returns to step 610. That is, the two selected MUs are not positioned such that an edge from the first MU is aligned with an edge from the second MU. It should be noted that step 615 may incorporate a step when the edge detection pattern is received on multiple sensors. That is, a different edge detection pattern is used to determine whether the two selected MUs have edges that are aligned.

If the MUs detect that edges are aligned, the method 600 continues to step 620. In step 620, a verification is performed whether the detected edges that are indeed aligned. Specifically, the MUs 500, 550 communicate with one another and determine an edge verification pattern. The emitters on the detected edges transmit the edge verification pattern such that the corresponding sensor on the other MU is to receive this edge verification pattern. If the edges are not verified to be aligned, the method 600 returns to step 610.

If the MUs verify that the edges are aligned, the method 600 continues to step 625. In step 625, a determination is made whether the verified aligned edges are sufficiently aligned for the aggregate display. As discussed above, a variety of criteria may be used to determine the sufficiency for aggregation such as discontinuities, a shape criterion, an orientation tolerance, an alignment tolerance, etc. If the MUs 500, 550 determine that the verified edges are not sufficiently aligned, the method 600 continues to step 630. In step 630, the MUs may indicate that there is an insufficient alignment of verified edges. Thus, in step 635, the MUs may be manually re-positioned. Subsequently, the method 600 returns to step 610 such that the edge alignment may again be analyzed.

It should be noted that the method 600 may include additional steps for indicating alignment or sufficiency in alignment. For example, as discussed above, an "alignment image" or "misalignment image" may be shown on the display devices of the MUs in which the edges are considered aligned. If the alignment image is shown, this may be indicative that the edges are aligned while the misalignment image may be indicative that the edges are not aligned. A user may see these image types to determine whether the MUs should be re-positioned during the course of the aggregated display being generated.

Returning to step 625, if the MUs have determined that the verified edges are sufficiently aligned, the method 600 continues to step 640. In step 640, a determination is made whether either of the MUs have a further edge which may be aligned with a further MU. For example, the MU 105 may have verified that the alignment with the MU 110 is sufficient. However, the MU 105 will have to verify that the alignment with the MU 120 is also sufficient while the MU 110 will have to verify that the alignments with the MUs 115, 125 are also sufficient. If further edge alignments are to be analyzed, the method 600 returns to step 610.

If no further edge alignment are to be analyzed for the two MUs, the method 600 continues to step 645. In step 645, a further pair of MUs are determined for edge alignment analysis. For example, if the MUs 105, 110 have both been fully analyzed for edge alignment, the MU 130 may still require determination of edge alignment. Thus, the entire set of MUs 105-145 may perform the edge alignment as the method 600 returns to step 610.

If all the MUs 105-145 have performed the edge alignment, the method 600 continues to step 650. In step 650, the controlling device is determined. As discussed above, the controlling device may be one of the MUs 105-145. Thus, through the inter-device communication, the MUs 105-145 may determine one thereof to be designated the controlling device. For example, based upon the edge alignment data shared among the MUs 105-145, a centrally disposed MU (e.g., MU 125) may be an optimal selection as this MU 125 may be able to communicate with all the co-located MUs 105-120, 130-145. The controlling device may also be the server 150.

It should be noted that all the co-located MUs communicating with a single controlling device MU 125 is only exemplary. Depending on the capabilities of the transceiver, particularly short range transceivers, the MUs may be configured for data to be communicated with intermediaries when a direct communications link is not possible. For example, if the MUs are aligned linearly, a left-most or right-most MU may be incapable of communicating with a centrally disposed MU if the distance is too great. Thus, the left-most MU may first communicate data to a MU involved in the aggregated display which forwards the data to another MU involved in the aggregated display, etc. to the controlling device.

In step 655, the edge alignment data for each of the MUs 105-145 are transmitted to the controlling device. Thus, in the first manner of aggregation, all the other MUs 105-120, 130-145 transmit the edge alignment data to the controlling device, MU 125. In the second manner of aggregation, all the MUs 105-145 transmit the edge alignment data to the server 150. In step 660, the controlling device determines the overall shape of the MUs and the display devices based upon the edge alignment data. When all are considered, the edge alignment data for each MU provides position and orientation data for the system of MUs. Specifically, the edges are verified to be aligned which may be used to determine the position of each MU within the co-located area. The edge alignment data from each MU may also indicate the size and shape of the respective display device, the size and shape of the respective housing, the relative position/orientation of the emitters/sensors, etc. that may also be considered in determining the position and orientation of the MUs within the co-located area. Accordingly, the overall shape is used to determine how the image is to be displayed in the aggregated display.

In step 665, the controlling device determines a respective portion to be shown on each display device of the MUs of the aggregated display based upon the position data of the MUs. For example, if all the MUs 105-145 are the same shape, size, and orientation and arranged as shown in FIG. 1 such that there are three rows and three columns, the controlling device may divide the image (that was received in step 605 for the first manner of aggregation or already stored in a memory arrangement of the server 150 for the second manner of aggregation) into nine equal portions. Thus, in step 670, each MU shows the respective portion on its display device.

For the first manner of aggregation, the controlling device may send a respective data packet to each MU to indicate the portion of the received image that its respective display device is to show. For example, the controlling device may indicate coordinate ranges such that the data packet indicates an area of the image since each MU has already received the image. In another example, the controlling device may divide the image accordingly and transmit the portion to each of the MUs. For the second manner of aggregation, the server 150 may divide the image accordingly and transmit each portion to the MUs.

It should be noted that the method 600 may include additional steps. For example, the method 600 may determine number of required display devices for the image. Through inter-device communication or by the server 150, the controlling device may determine that there are superfluous MUs present in the co-located area. For example, in the system of FIG. 1, the MUs 105-130 may be utilized to show the image but the MUs 135-145 may be superfluous as some property of the image (e.g., aspect ratio) may be negatively affected to a degree that the image is no longer properly shown. In such a scenario, the controlling device may indicate that the MUs 135-145 are extraneous such that they may be manually removed. The controlling device may also incorporate the superfluous MUs into the aggregated image. The image to be shown in the aggregated display may not extend across all the MUs such as to the MUs 135-145. The controlling device may select a "filler" portion to be shown on the MUs 135-145 such that they remain within the aggregated display. For example, a subsequent image that is shown in the aggregated display may utilize all the MUs 135-145. Therefore, removal of these MUs 135-145 may affect how the subsequent image is shown.

The exemplary embodiments provide a system including a plurality of mobile units and a method for aggregating a display. Specifically, the exemplary embodiments determine proper edge alignment for aggregating the respective display devices of the mobile units. The mobile units are configured for inter-device communication such that a collaborative manner is provided in which each mobile unit involved in the aggregate display communicate with one another to determine the edges that are aligned between them. In a first step, a pair of mobile units, sets of mobile units, or all the mobile units communicates such that an edge detection pattern is used on all emitters using common or different edge detection patterns. When an edge from one of the mobile units is aligned with an edge of the other mobile unit based upon the edge detection pattern, the pair of mobile units communicates such that an edge verification pattern is used on the emitters of the detected edges. When the edge from first mobile unit is verified to be aligned with the edge of the second mobile unit, the pair of mobile units communicates to determine whether these verified edges are sufficiently aligned with each other based upon a set of predetermined criteria.

Once all the mobile units have determined their edge alignments with the other co-located mobile units, a controlling device may receive the edge alignment data such that the image to be shown in the aggregated display may be properly divided to the mobile units. Thus, the image may be shown across all the display devices that are aggregated in which all edges are properly aligned.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system, comprising:
a plurality of devices positioned within a predetermined area, each device having a plurality of edges, at least one device of the plurality of devices further comprising:
a transceiver operated to establish an inter-device communication with at least one other device of the plurality of devices to determine a first edge pattern and a second edge pattern;
an emitter disposed along at least one edge of the plurality of edges, the emitter operated to transmit the first edge pattern to the at least one other device;
a sensor disposed along the at least one edge of the plurality of edges, the sensor operated to receive the second edge pattern from the at least one other device; and
a display device,
wherein when the first edge pattern is received by a further sensor disposed along at least one other edge of the at least one other device and the second edge pattern is received by the sensor of the at least one device, and further when the at least one edge along which the sensor of the at least one device is disposed and the at least one other edge along which the further sensor of the at least one other device is disposed are verified to be aligned, the display device of the at least one device and a further display device of the at least one other device are operated to form an aggregated display.

2. The system of claim 1, wherein one of the plurality of devices is a controlling device that determines a respective portion of an image to be shown on the display device and the further display device in the aggregated display.

3. The system of claim 1, further comprising:
a server that determines a respective portion of an image to be shown on the display device and the further display device in the aggregated display.

4. The system of claim 1, wherein the determined first and second edge patterns are transmitted from the at least one device to the at least one other device during the inter-device communication.

5. The system of claim 1, wherein the transceiver is further operated to establish the inter-device communication to determine a third edge pattern and a fourth edge pattern, and further wherein the at least one edge along which the sensor of the at least one device is disposed and the at least one other edge along which the further sensor of the at least one other device is disposed are verified to be aligned when the third edge pattern is received by the further sensor disposed along the at least one other edge of the at least one other device and the fourth edge pattern is received by the sensor of the at least one device.

6. The system of claim 5, wherein the at least one device is operated to verify whether the at least one edge along which the sensor of the at least one device is disposed and the at least one other edge along which the further sensor of the at least one other device is disposed are sufficiently aligned as a function of a set of predetermined criteria including at least one of discontinuity data, tolerance value data, alignment tolerance value data, and shape analysis data.

7. The system of claim 6, wherein the aggregated display shows an alignment image when the at least one edge along which the sensor of the at least one device is disposed and the at least one other edge along which the further sensor of the at least one other device is disposed are sufficiently aligned.

8. The system of claim 6, wherein the aggregated display shows a misalignment image when the at least one edge along which the sensor of the at least one device is disposed and the at least one other edge along which the further sensor of the at least one other device is disposed are not sufficiently aligned.

9. The system of claim 8, wherein at least one of the display device and the further display device shows a feedback indicating that the display device and the further display device are not properly aligned when the at least one edge along which the sensor of the at least one device is disposed and the at least one other edge along which the further sensor of the at least one other device is disposed are not sufficiently aligned.

10. The system of claim 1, wherein the emitter is one of electromagnet, optical emitter, audio emitter, electrical contact, and a combination thereof, wherein the sensor is a corresponding one of hall effect sensor, optical sensor, audio sensor, electrical connector, and a combination thereof.

11. A method for automating aggregation of multiple display devices, the method comprising:
  establishing an inter-device communication between a device and at least one other device to determine a first edge pattern and a second edge pattern;
  activating an emitter disposed along at least one edge of a plurality of the edges of the device to transmit the first edge pattern to the at least one other device;
  activating a sensor disposed along the at least one edge of the plurality of the edges of the device to receive the second edge pattern from the at least one other device;
  when the first edge pattern is received by a further sensor disposed along at least one other edge of a plurality of edges of the at least one other device and the second edge pattern is received by the sensor of the device, verifying whether the at least one edge along which the sensor of the device is disposed and the at least one other edge along which the further sensor of the at least one other device is disposed are aligned; and
  operating a display device in the device and a further display device in the at least one other device to form an aggregated display when the at least one edge along which the sensor of the device is disposed and the at least one other edge along which the further sensor of the at least one other device is disposed are verified to be aligned.

12. The method of claim 11, further comprising
determining a controlling device from one of the device and the at least one other device, the controlling device further determining a respective portion of an image to be shown on the display device and the further display device in the aggregated display.

13. The method of claim 11, further comprising:
determining a respective portion of an image to be shown on the display device in the device and the further display device in the at least one other device in the aggregated display using a server.

14. The method of claim 11, further comprising:
transmitting the determined first and second edge patterns from the device to the at least one other device during the inter-device communication between the device and the at least one other device.

15. The method of claim 11, wherein verifying further comprises:
  establishing the inter-device communication between the device and the at least one other device to determine a third edge pattern and a fourth edge pattern;
  activating the emitter of the device to transmit the third edge pattern to the at least one other device;
  activating the sensor of the device to receive the fourth edge pattern from the at least one other device; and
  when the third edge pattern is received by the further sensor disposed along the at least one other edge of the at least one other device and the fourth edge pattern is received by the sensor of the device, verifying that the at least one edge along which the sensor of the device is disposed and the at least one other edge along which the further sensor of the at least one other device is disposed are aligned.

16. The method of claim 11, further comprising verifying whether the at least one edge along which the sensor of the device is disposed and the at least one other edge along which the further sensor of the at least one other device is disposed are sufficiently aligned as a function of a set of predetermined criteria including at least one of discontinuity data, tolerance value data, alignment tolerance value data, and shape analysis data.

17. The method of claim 16, further comprising showing a feedback either on the display device or the further display device to indicate that the display device and the further display device are not properly aligned when the at least one edge along which the sensor of the device is disposed and the at least one other edge along which the further sensor of the at least one other device is disposed are not sufficiently aligned.

18. A device positioned within a predetermined area, comprising:
  a housing having a plurality of edges;
  a display device positioned within the housing to occupy at least a portion of a face of the housing;
  a transceiver operated to establish an inter-device communication with at least one of a plurality of other devices positioned within the predetermined area;
  an emitter and a sensor disposed along at least one edge of the plurality of edges; and
  a processor communicatively coupled to the transceiver, emitter, sensor, and the display device, the processor operated to
    determine a first edge pattern and a second edge pattern when the inter-device communication is established with the at least one of the plurality of other devices,
    activate the emitter to transmit the determined first edge pattern to the at least one of the plurality of other devices,
    activate the sensor to receive the determined second edge pattern from the at least one of the plurality of other devices,
    when the first edge pattern is received by a further sensor disposed along at least one other edge of a plurality of edges of a further housing in the at least one of the plurality of other devices and the second edge pattern is received by the sensor of the device, verifying whether the at least one edge along which the sensor of the device is disposed and the at least one other edge along which the further sensor of the at least one of the plurality of other devices is disposed are aligned, and
    activate the display device of the device to form an aggregated display with a further display device positioned within the further housing of the at least one of the plurality of other devices when the at least one edge along which the sensor of the device is disposed and the at least one other edge along which the further sensor of the at least one of the plurality of other devices is disposed are verified to be aligned.

19. The device of claim 18, wherein the processor is further operated to determine a respective portion of an image to be shown on the display device and the further display device in the aggregated display.

20. The device of claim 18, wherein a shape and size of the display device positioned within the housing of the device is different from a shape and size of the further display positioned within the further housing of the at least one of the plurality of other devices.

\* \* \* \* \*